United States Patent
Bu et al.

(10) Patent No.: US 9,036,540 B2
(45) Date of Patent: May 19, 2015

(54) METHOD AND SYSTEM FOR CORRELATING IP LAYER TRAFFIC AND WIRELESS LAYER ELEMENTS IN A UMTS/GSM NETWORK

(75) Inventors: Tian Bu, Edison, NJ (US); Ruth Schaefer Gayde, Naperville, IL (US); Scott C. Miller, Freehold, NJ (US); Kathleen Ellen Moczulewski, Warrenville, IL (US); Alex Ibrahim Moukalled, Naperville, IL (US); Samphel Norden, West Orange, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1238 days.

(21) Appl. No.: 11/905,242

(22) Filed: Sep. 28, 2007

(65) Prior Publication Data

US 2009/0088147 A1      Apr. 2, 2009

(51) Int. Cl.
*H04W 12/12* (2009.01)
*H04L 29/06* (2006.01)
*H04W 24/08* (2009.01)
*H04W 80/04* (2009.01)

(52) U.S. Cl.
CPC ........... *H04W 12/12* (2013.01); *H04L 63/1416* (2013.01); *H04L 63/1458* (2013.01); *H04W 24/08* (2013.01); *H04W 80/04* (2013.01)

(58) Field of Classification Search
None
See application file for complete search history.

(56) References Cited

U.S. PATENT DOCUMENTS

| 6,731,621 B1 | 5/2004 | Mizutani et al. |
|---|---|---|
| 6,952,582 B2 | 10/2005 | Murai |
| 2006/0128406 A1 | 6/2006 | Macartney |
| 2006/0230450 A1 | 10/2006 | Bu et al. |

(Continued)

FOREIGN PATENT DOCUMENTS

| EP | 1 487 160 | 12/2004 |
|---|---|---|
| JP | 11-355281 | 12/1999 |

(Continued)

OTHER PUBLICATIONS

"K1297/K1205 Series Protocol Tester," Internet Citation, Nov. 2002, pp. 1-4, XP002225050, Retrieved from the Internet: www.tektronix.com/mobile, Retrieved on Dec. 16, 2002.

(Continued)

*Primary Examiner* — Christine Duong
(74) *Attorney, Agent, or Firm* — Harness, Dickey & Pierce, P.L.C.

(57) ABSTRACT

The present invention relates to a correlation module for correlating IP layer traffic and wireless layer network elements in a network. According to an example embodiment, the correlation module includes an RNC analyzer, a Gn snoop unit, and/or a mapping unit. The RNC analyzer is configured to collect wireless layer network element information from at least one RNC. The Gn snoop unit is configured to collect wireless layer network element information and IP layer traffic information from at least one Gn interface between a serving GPRS support node and a gateway GPRS support node. The mapping unit is configured to map the IP layer traffic and the wireless layer network elements in the network based on the collected IP layer traffic information and the collected wireless layer network element information. A method of correlating IP layer traffic and wireless layer network elements in a network is also disclosed.

18 Claims, 6 Drawing Sheets

(56) References Cited

U.S. PATENT DOCUMENTS

2007/0143769 A1    6/2007  Bu et al.
2007/0232276 A1*  10/2007  Andersson ................. 455/414.1
2010/0061386 A1*  3/2010  Olsson et al. ................. 370/401

FOREIGN PATENT DOCUMENTS

JP    2002-064851    2/2002
JP    2005-006312    1/2005

OTHER PUBLICATIONS

International Search Report and Written Opinion dated Jul. 16, 2009.
Chinese Office Action dated Jun. 20, 2012, issued in corresponding Chinese Patent Application No. 200880107785.5, and English translation thereof.
Japanese Office Action dated Feb. 20, 2012, issued in corresponding Japanese Patent Application No. 2010-526897, and English translation thereof.

* cited by examiner

FIG. 4

| RNC | SAI/CGI |
|---|---|
| RNC 1 | Location 1 |
| RNC 1 | Location 2 |
| RNC 2 | Location 3 |
| ⋮ | ⋮ |

FIG. 5

| Terminal | PDP Context | SAI/CGI |
|---|---|---|
| IMEI 1 (Mobile 1) | abc | Location 1 |
| IMEI 2 (Mobile 2) | def | Location 2 |
| IMEI 3 (Mobile 3) | xyz | Location 3 |

FIG. 6

| RNC | SAI/CGI | IMEI | IMSI | IP Addr. | TEID | SGSN Addr. |
|---|---|---|---|---|---|---|
| RNC 1 | Location 1 | IMEI 1 | IMSI 1 | Addr. 1 | TEID 1 | SGSN 1 |
| RNC 1 | Location 2 | IMEI 2 | IMSI 2 | Addr. 2 | TEID 2 | SGSN 1 |
| RNC 2 | Location 3 | IMEI 3 | IMSI 3 | Addr. 3 | TEID 3 | SGSN 2 |
| ⋮ | ⋮ | ⋮ | ⋮ | ⋮ | ⋮ | ⋮ |

METHOD AND SYSTEM FOR CORRELATING IP LAYER TRAFFIC AND WIRELESS LAYER ELEMENTS IN A UMTS/GSM NETWORK

BACKGROUND OF THE INVENTION

With recent innovations in wireless network technology has come an increased interest in wireless network security and general wireless network awareness, especially with the development of third generation 3G multimedia capable technologies. Wireless networks are substantially more susceptible to security threats and intrusion than are wireline networks due to the nature of the interface between devices.

For example, in the well known signaling attack, an internet host overloads a wireless network by sending packets at low volume that trigger an excessive amount of signaling/paging events. As another example, in the well known energy attack, an internet host sends appropriately timed packets that inhibit a mobile unit's ability to enter a sleep mode. Such an attack exploits the energy saving functions of the mobile unit and may severely cripple its battery life.

FIG. 1 illustrates several basic components of a conventional Universal Mobile Telecommunications System (UMTS) network.

As shown, a UMTS network 100 typically includes a User Equipment (UE) domain 110, a UMTS Terrestrial Radio Access Network (UTRAN) 120, and a General Packet Radio Services (GPRS) Core Network 130. The UE domain 110 includes UEs or mobile stations 111, etc., and communicates wirelessly with the UTRAN 120. The mobile station 111 may be a cell phone, a wireless PDA, a "WiFi"—equipped computer, or the like, for example. The UTRAN 120 includes a base station (Node B) 121, a Radio Network Controller (RNC) 123, etc., and acts as an intermediary between the UE 110 and the Core Network 130. Namely, UTRAN 120 communicates with mobile stations 111 over the air interface.

The Core Network 130 includes at least one Serving GPRS Support Node (SGSN) 131 and a Gateway GPRS Support Node (GGSN) 133. The SGSN 131 and the GGSN 133 communicate with each other via a Gn interface 135 using the GPRS Tunneling Protocol (GTP), which is the standard IP protocol of GPRS Core Networks. The GGSN 133 communicates with an external network, such as the Internet, via a Gi interface 137. A Global System for Mobile communications (GSM) network, the predecessor of UMTS, uses similar components.

The conventional network architecture of a UMTS/GSM network is well known in the art, and therefore a more detailed description here will be omitted.

SUMMARY

Many security threats and network anomalies, such as the signaling attack and the energy attack, are caused by IP layer activity, but affect the wireless layer network components. However, these attacks cannot be detected at the IP level without knowledge of the state of the underlying wireless level. Moreover, the source of the attack cannot be identified using just the wireless layer information without correlating it with the IP layer. Accordingly, the present invention provides a way to correlate the IP layer network traffic with the underlying wireless layer network elements.

The present invention relates to a correlation module for correlating IP layer traffic and wireless layer network elements in a network. According to an example embodiment, the correlation module includes an RNC analyzer, a Gn snoop unit, and/or a mapping unit. The RNC analyzer is configured to collect wireless layer network element information from at least one RNC. The Gn snoop unit is configured to collect wireless layer network element information and IP layer traffic information from at least one Gn interface between a serving GPRS support node and a gateway GPRS support node. The mapping unit is configured to map the IP layer traffic and the wireless layer network elements in the network based on the collected IP layer traffic information and the collected wireless layer network element information.

The present invention also relates to a method of correlating IP layer traffic and wireless layer network elements in a network. According to another example embodiment, the method includes collecting wireless layer network element information, collecting IP layer traffic information, and/or mapping the IP layer traffic and the wireless layer network elements in the network. The wireless layer network element information is collected from at least one RNC and at least one Gn interface between a serving GPRS support node and a gateway GPRS support node. The IP layer traffic information is also collected from the at least one Gn interface. The IP layer traffic and the wireless layer network elements in the network are mapped based on the collected IP layer traffic information and the collected wireless layer network element information.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

FIG. 4 illustrates an example provisioning data table for the network components of FIG. 3 constructed by an RNC analyzer according to an example embodiment of the present invention.

FIG. 5 illustrates an example IP traffic data table for the network components of FIG. 3 constructed by a Gn snoop unit according to an example embodiment of the present invention.

FIG. 6 illustrates an example dynamic correlation table mapping the components of FIG. 3 to corresponding IP layer traffic and constructed by a mapping unit according to an example embodiment of the present invention.

DESCRIPTION OF EXAMPLE EMBODIMENTS

Figure 1:
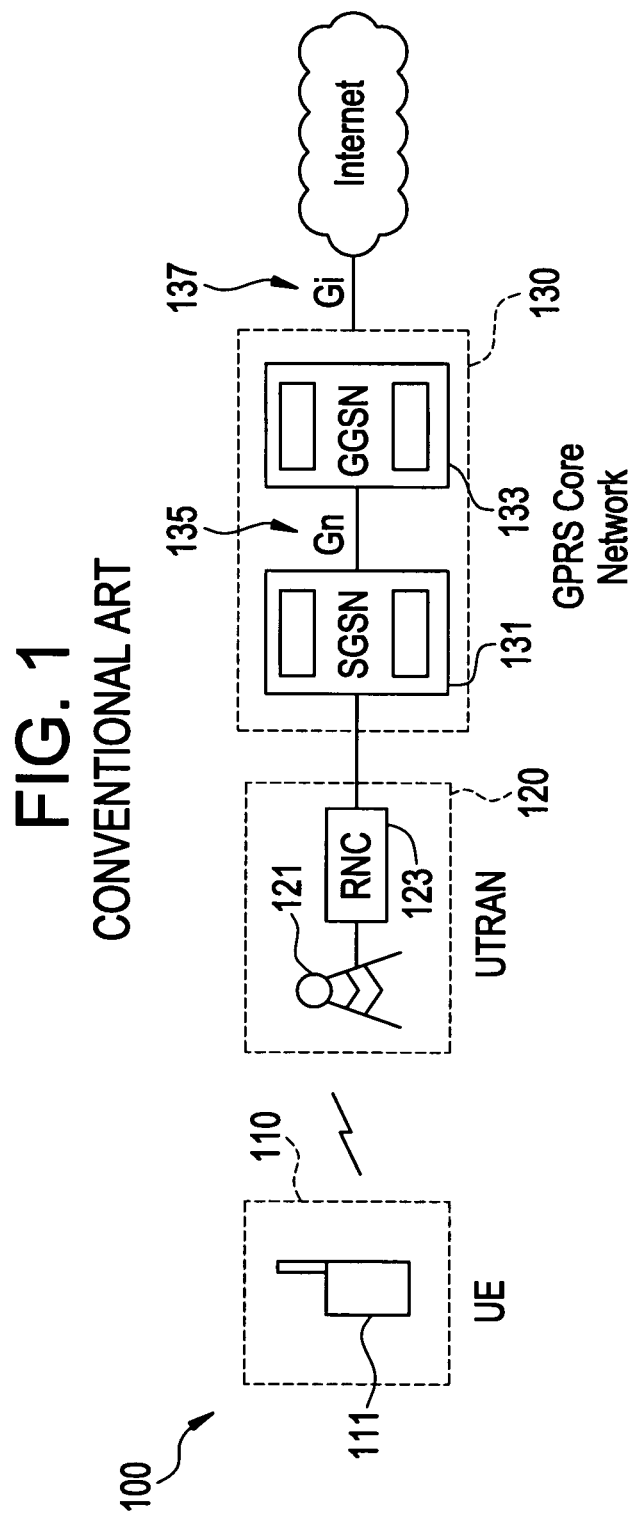
FIG. 1 illustrates several basic components of a conventional Universal Mobile Telecommunications System (UMTS) network.

Detailed example embodiments of the present invention are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit the present invention to the particular forms disclosed, but to the contrary, the present invention is to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Many security threats and network anomalies, such as the signaling attack and the energy attack, are caused by IP layer activity, but affect the wireless layer network components. However, these attacks cannot be detected at the IP level without knowledge of the state of the underlying wireless level. Moreover, the source of the attack cannot be identified using just the wireless layer information without correlating it with the IP layer. Accordingly, the present invention provides a way to correlate the IP layer network traffic with the underlying wireless layer network elements.

Figure 2:
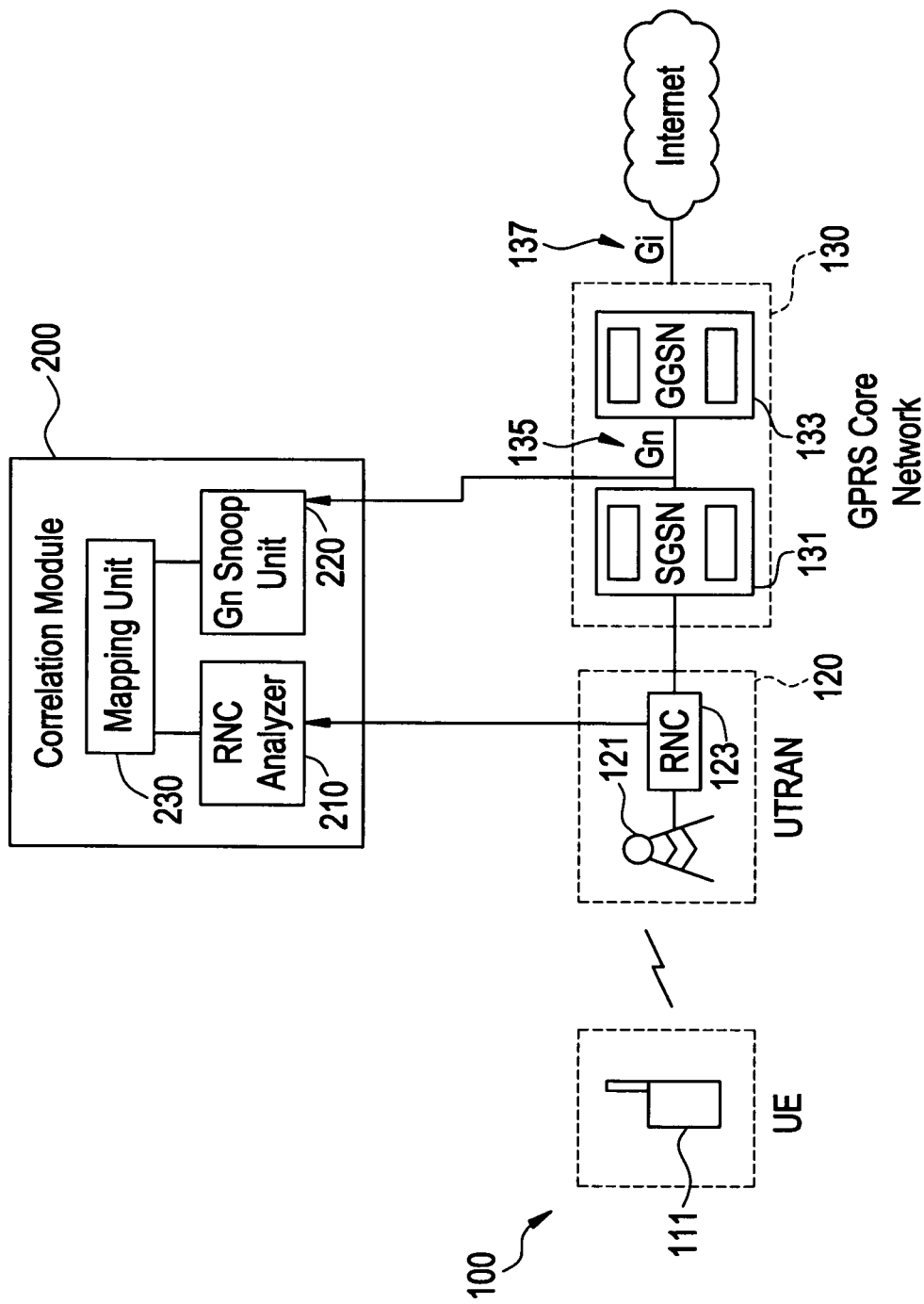
FIG. 2 illustrates a correlation module used in conjunction with the conventional UMTS network of FIG. 1 according to an example embodiment of the present invention.

FIG. 2 illustrates a correlation module used in conjunction with the conventional UMTS network of FIG. 1 according to an example embodiment of the present invention.

As shown, a correlation module 200 collects information from the RNC 123 and the Gn interface 135. The correlation module 200 includes an RNC analyzer 210, a Gn snoop unit 220, and a mapping unit 230. The RNC analyzer 210 collects the information from the RNC unit 123, and the Gn snoop unit 220 collects the information from the Gn interface 135. The mapping unit 230 is connected to both the RNC analyzer 210 and the Gn snoop unit 220.

The RNC analyzer 210 collects and analyzes information from the RNC 123. When a mobile station 111 wishes to connect to a desired service, the mobile station 111 sends a Call Setup Request message to Node B 121, which is processed by the corresponding RNC 123. The RNC 123 keeps track of certain information about the mobile station 111, including an associated Service Area Identity (SAI) for a UMTS network or an associated Cell Global Identification (CGI) for a GSM network. In general, SAI/CGI positioning technology determines the current cell in which a mobile subscriber is located by identifying the Public Land Mobile Network ID, the Location Area Code, and the Service Area Code of the particular mobile subscriber of interest. The SAI/CGI is used to determine the physical location of the mobile station 111, which enables various location-relevant services including Mobile Internet to be provided. This information is retained in the RNC 123 configuration file for all active calls.

The RNC analyzer 210 derives a static table of provisioning data from the RNC 123. As used hererin, a static table is one that changes relatively slowly as compared to a dynamic table. For example, the RNC analyzer 210 may query the RNC 123 for the information stored in its configuration file. Alternatively, the RNC analyzer 210 may receive manual inputs of provisioning data, for example, from a third party source. The provisioning data maps what SAIs/CGIs are served by the RNC 123. Although a single RNC 123 and a single mobile station 111 are shown in FIG. 2 for illustration purposes, it will be recognized by one of ordinary skill in the art that multiple RNCs may be present in a given network, and multiple or zero mobile stations may be connected to each RNC. Thus, in general, the RNC analyzer 210 collects provisioning data including SAI/CGI information from all relevant RNCs in a given network.

Figure 3:
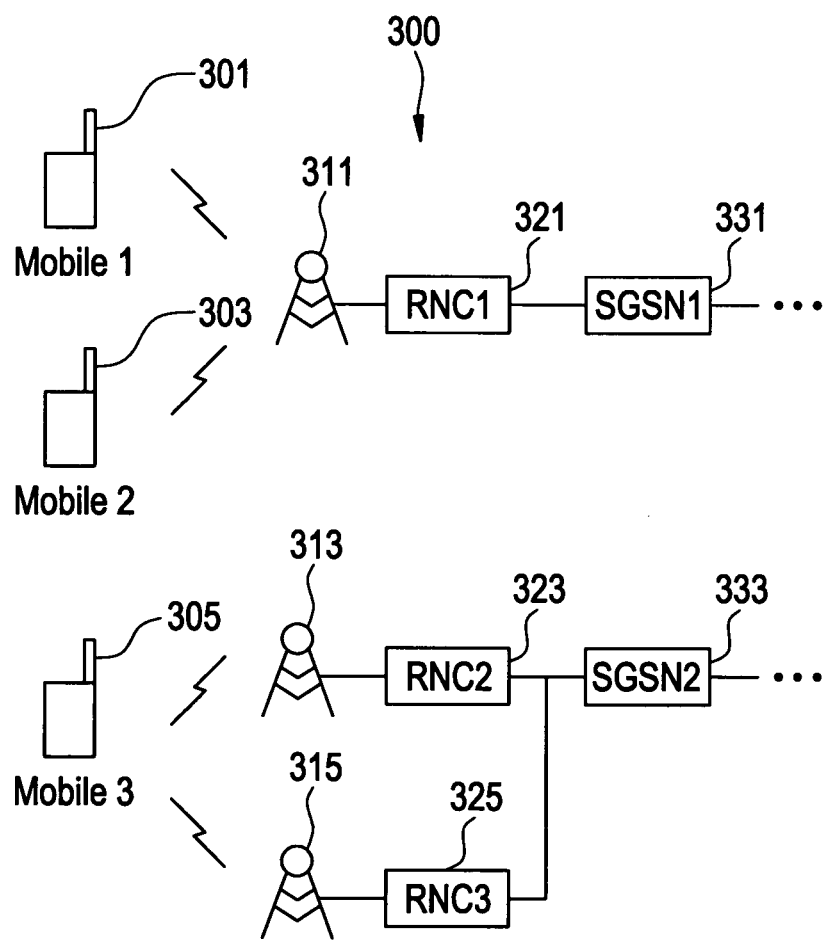
FIG. 3 illustrates an example UMTS/GSM network with selected components shown for illustration purposes.

FIG. 3 illustrates an example network 300 with selected components shown for illustration purposes. As shown, first and second mobile stations 301 and 303 communicate with a common first Node B 311 and associated first RNC 321. The first RNC 321 accesses GPRS services through a first SGSN 331. A third mobile station 305 communicates with a second Node B 313 and associated second RNC 323. The second RNC 323 accesses GPRS services through a second SGSN 333. It will be appreciated by one of ordinary skill in the art that each SGSN may serve more than one RNC, and that a given RNC may not be actively communicating with any mobile stations. For example, a third Node B 315 is shown with no mobile stations connected and associated with a third RNC 325. The third RNC 325 also accesses GPRS services through the second SGSN 333.

FIG. 4 illustrates an example provisioning data table for the network components of FIG. 3 constructed by an RNC analyzer according to an example embodiment of the present invention. As shown, the table maps user location information (SAI/CGI) and corresponding RNCs within the network. In the example of FIG. 4, and with reference to FIG. 3, the first RNC 321 designated as RNC1 serves a first location (SAI/CGI) designated as Location1. The second RNC 323 designated as RNC2 serves a second location (SAI/CGI) designated as Location2. The third RNC 325 designated as RNC3 serves a third location designated as Location3. This mapping continues for each relevant additional RNC. With reference to FIG. 2, this table is sent by the RNC analyzer 210 to the mapping unit 230.

Referring back to FIG. 2, the Gn snoop unit 220 collects and analyzes data from the Gn interface 135 between the SGSN 131 and the GGSN 133. A single SGSN is shown in FIGS. 1 and 2 for illustrative purposes, however, one of ordinary skill in the art will recognize that multiple SGSNs may connect to a given GGSN using a corresponding number of separate Gn interfaces. Accordingly, while the Gn snoop unit 220 is shown as snooping the lone Gn interface 135 for illustration purposes, the Gn snoop unit 220 is capable of snooping multiple Gn interfaces concurrently.

A Gn interface supports communication using GPRS Tunneling Protocol (GTP) packets, including GTP control plane (GTP-c) and GTP user plane (GTP-u) messages. GTP-c messages are used to carry information about wireless signaling, whereas GTP-d messages are used to carry encapsulated IP data traffic.

When the mobile unit 111 wishes to begin a new data session, for example, to check e-mail via a connection with the internet, a new Packet Data Protocol (PDP) context is established using GTP-c packets. A PDP context is a data structure which contains a subscriber's session information when the subscriber has an active session. When the mobile station 111 wants to use GPRS services, it establishes a PDP context with its corresponding SGSN 131. When a new PDP context is established, the SGSN 131 sends a Create PDP Context Request message to the GGSN 133. The GGSN 133 returns a Create PDP Context Response message.

For a successful PDP Context Create, the pair of Request/Response messages typically contains the following fields: International Mobile Subscriber Identity (IMSI), International Mobile Equipment Identity (IMEI), User Location Information (SAI or CGI), End User Address (IP Addr.), Tunnel Endpoint Identifier (TEID), and SGSN Address. The Gn snoop unit 220 snoops the Gn interface 135 and decodes PDP Context information from GTP-c packets passed between the SGSN 131 and the GGSN 133 to collect the above described information for each PDP Context. As the PDP Context information is decoded from the GTP-c packets, the Gn snoop unit 220 passes the derived information fields listed above from each active data session to the mapping unit 230.

FIG. 5 illustrates an example table mapping terminals, PDP Context information, and SAI/CGI information from the data snooped by the Gn snoop unit 220 for the example network components of FIG. 3. As shown in FIG. 5, and with reference to FIG. 3, a first terminal IMEI1 corresponding to mobile 301 is mapped to SAI/CGI Location1 using snooped PDP Context information 'abc'. A second terminal IMEI2 corresponding to mobile 303 is also mapped to SAI/CGI Location1 using snooped PDP Context information 'def'. A third terminal IMEI3 corresponding to mobile 305 is mapped to SAI/CGI Location2 using snooped PDP Context information 'xyz'. The PDP Context information fields 'abc', 'def', 'xyz', etc., may in fact represent identifiers for the various snooped GTP-c messages, such as Network Service Access Point Identifiers (NSAPI) or the like. The PDP Context information may be used to further map the IMSI, IP Addr., TEID, and SGSN Addr. fields described above. Although mobile 301 and mobile 303 are illustrated here as having the same SAI/CGI location, each RNC may serve more than one service area or cell, and thus, mobile stations sharing a common RNC may in fact have different SAI/CGI location information.

The mapping unit 230 correlates the IP layer traffic with the underlying wireless layer network components using the SAI or CGI field as a common adjoining field between the information provided by the RNC analyzer 210 and the Gn snoop unit 220. In this way, the mapping unit 230 creates a dynamic table that maps each connecting mobile station with its corresponding RNC, IMSI, IMEI, SAI/CGI, IP Addr., TEID, and SGSN Addr.

FIG. 6 illustrates an example dynamic correlation table mapping the components of FIG. 3 to corresponding IP layer traffic and constructed by a mapping unit according to an example embodiment of the present invention. In the table, a mapping of wireless layer components and IP layer traffic is constructed using each of the information fields described above, including IMEI, RNC, SAI/CGI, IMSI, IP Addr., TEID, and SGSN Addr. For example, mobile station 301, mapped to IMEI1 and PDP Context information (from which is derived IMSI1, IP Addr.1, TEID1, and SGSN1) by the Gn snoop unit 220 as shown in FIG. 5, is further mapped to RNC1 from the provisioning data of FIG. 4. The remaining mobile stations 303 and 305 are mapped in a similar manner.

The PDP Contexts discussed thus far have been Primary PDP Contexts, which have a unique IP address associated with them. Secondary PDP Contexts, on the other hand, share an IP address with another PDP Context. Secondary PDP Contexts are created based on an existing PDP context (to share the IP address) and may have different Quality of Service (QoS) requirements. In addition, other PDP Context information, including Update PDP Context and Delete PDP Context information, may be exchanged between the SGSN 131 and the GGSN 133 to change a particular GPRS session. These messages are also snooped, analyzed, and passed to the mapping unit 230 by the Gn snoop unit 220, similar to the manner discussed above, to ensure that the dynamic mapping of IP layer and wireless layer traffic is updated and current.

As will be discussed in more detail later, these correlation tables provide important inputs for network attack/anomaly detection.

Figure 7:
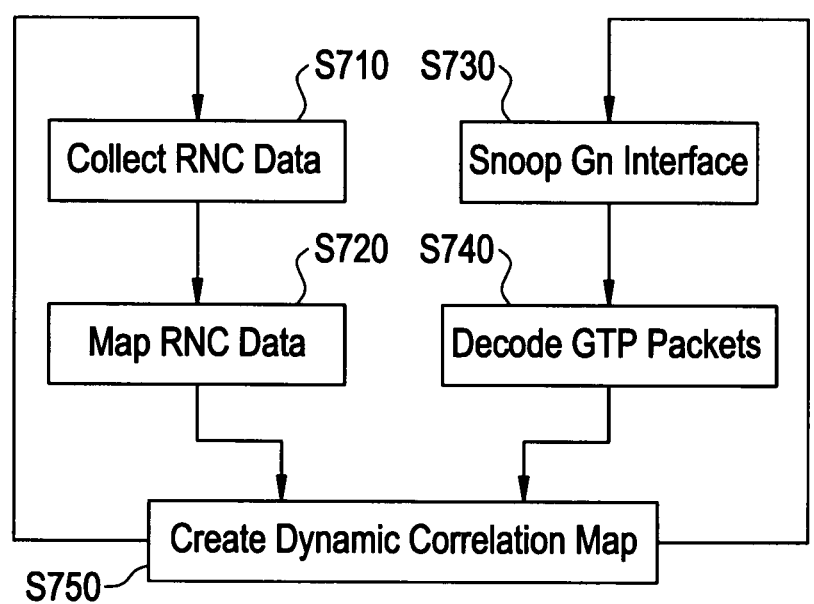
FIG. 7 illustrates a method of correlating IP layer and wireless layer traffic according to an example embodiment of the present invention.

FIG. 7 illustrates a method of correlating IP layer and wireless layer traffic according to an example embodiment of the present invention.

With reference to FIGS. 2 and 7, in Step S710, provisioning data is collected from the RNC 123, including the SAIs/CGIs served by each RNC 123. In Step S720, each RNC 123 is mapped with its corresponding SAIs/CGIs. As discussed above, this mapping provides information about the wireless layer components.

In Step S730, GTP packets traveling across each Gn interface 135 are snooped to gain information about IP traffic in the network. In Step S740, the intercepted GTP messages are decoded. As discussed above, PDP Context information being transported using the GTP-c packets across each Gn interface 135 contains information about IP traffic, including IMSI, IMEI, User Location Information (SAI or CGI), End User Address, TEID, and SGSN Address fields.

In Step S750, the PDP Context information fields decoded from the GTP packets are correlated with the data collected from each RNC 123. As discussed above, both sets of data include the SAI/CGI field, and thus, using the SAI/CGI field as a common link, a table mapping IP traffic in the network to underlying wireless layer components is created.

To make the correlation table dynamic, it is constantly updated with current IP layer traffic and wireless layer component information. As illustrated in FIG. 7, once the decoded Gn interface information and RNC provisioning data are correlated to form a correlation table in Step S750, processing returns to the collecting step Step S710 and snooping step Step S720. Thus, the method according to an example embodiment of the present invention provides a way to dynamically correlate IP layer traffic with underlying wireless layer network elements.

As alluded to previously, the above described IP and wireless layer correlation information derived according to example embodiments of the present invention may be used in the mitigation of network security threats. For example, the correlation information may be used to identify a particular internet host sending malicious traffic targeting the wireless network. If a subscriber is bombarded with excessive signaling packets, as in the well known signaling attack, the source of the attack can be traced back to the malicious internet host using the correlation table, as illustrated for example in FIG. 6, to bridge the wireless and IP layers.

Furthermore, the correlation table may also be used to detect an attack from data traffic that targets a particular RNC or mobile station. For example, because the GTP-d packets responsible for a given attack contain information about TEID and IP Addr., when these packets are analyzed, the particular mobile station and RNC targeted by the attack may be derived using the correlation table. In addition, potentially harmful data packets on a Gi interface between a given GGSN and the internet, illustrated in FIG. 1 as Gi interface 137, contain an IP Addr. field for the targeted mobile station. Thus, these packets may also be analyzed for the targeted mobile station and traversing RNC using the correlation table.

As a further example, with reference to FIG. 2, a compromised subscriber that sends attacking traffic through the GPRS Core Network 130 to other mobile stations 111 may also be identified, including identification of the subscriber's IP address. The RNC 123, the SGSN 131, and the GGSN 133 that carry a particular IP flow, e.g. a web session, may also be identified.

The correlation system and method according to the present invention may also be implemented as part of a larger network security defense system.

Example embodiments having thus been described, it will be obvious that the same may be varied in many ways. For example, the present invention need not be applied exclusively to network security. The present invention provides a way to identify the network resources (e.g., mobile battery, RNC) affected by incoming IP traffic, among other information, which is inherently useful in many non-security applications.

Such variations are not to be regarded as a departure from the intended spirit and scope of the present invention, and all such modifications as would be obvious to one skilled in the art are intended to be included within the scope of the following claims.

What is claimed is:

1. A correlation module for correlating IP layer traffic and wireless layer network elements in a network, the correlation module comprising:
   a processing device including,
      a Radio Network Controller (RNC) analyzer configured to collect first wireless layer network element information from at least one RNC and create an association between user location information and the RNC based on the collected first wireless layer network element information,
      an interface snoop unit configured to collect second wireless layer network element information and Internet Protocol (IP) layer traffic information from at least one interface between a serving General Packet Radio Services (GPRS) support node and a gateway GPRS support node, wherein the interface snoop unit is configured to collect the second wireless layer network element information and the IP layer traffic information by decoding and deriving context information from messages sent across the at least one interface such that the context information is passed through the interface snoop unit, and
      a mapping unit configured to map the IP layer traffic and the wireless layer network elements in the network based on the collected IP layer traffic information, the passed context information, and the created association between the user location information and the RNC,
   wherein the first wireless layer network information collected by the RNC analyzer and the passed context information each include a Service Area Identity or Cell Global Identification field, and the mapping unit is configured to use the Service Area Identity or Cell Global Identification field as a common field to map the IP layer traffic and the wireless layer network elements in the network.

2. The correlation module of claim 1, wherein the first wireless layer network element information collected by the RNC analyzer includes provisioning data that identifies at least one Service Area Identity or Cell Global Identification served by each RNC.

3. The correlation module of claim 2, wherein the RNC analyzer creates an association between the user location information and the RNC by creating a table from the provisioning data that maps each identified Service Area Identity or Cell Global Identification to its corresponding serving RNC.

4. The correlation module of claim 1, wherein the passed context information is Packet Data Protocol (PDP) Context information from GPRS Tunneling Protocol messages sent across each interface.

5. The correlation module of claim 4, wherein the passed context information collected by the interface snoop unit includes a Service Area Identity or a Cell Global Identification, and at least one of an International Mobile Subscriber Identity, an International Mobile Equipment Identity, an End User Address, a Tunnel Endpoint Identifier, and a Serving GPRS Support Node (SGSN) Address.

6. The correlation module of claim 1, wherein the mapping unit maps at least one mobile station to a corresponding RNC.

7. The correlation module of claim 6, wherein the mapping unit further maps the at least one mobile station and the corresponding RNC to at least one of a corresponding International Mobile Subscriber Identity, End User Address, Tunnel Endpoint Identifier, and Serving GPRS Support Node (SGSN) Address.

8. The correlation module of claim 1, wherein the mapping unit continually updates the mapping of the IP layer traffic and the wireless layer network elements.

9. The correlation module of claim 8, wherein the continually updating is based on at least one of Update Packet Data Protocol (PDP) Context or Delete PDP Context information collected from the at least one interface by the interface snoop unit.

10. A method of correlating IP layer traffic and wireless layer network elements in a network, the method comprising:
   collecting, by a processing device, first wireless layer network element information from at least one Radio Network Controller (RNC);
   creating, by the processing device, an association between user location information and the RNC based on the collected first wireless layer network element information;
   collecting, by the processing device, second wireless layer network element information and Internet Protocol (IP) layer traffic information from at least one interface between a serving General Packet Radio Services (GPRS) support node and a gateway GPRS support node, wherein the collecting second wireless layer network element information and the IP layer traffic information includes decoding and deriving context information from messages sent across the at least one interface such that the context information is passed through the at least one interface; and mapping, by the processing device, the IP layer traffic and the wireless layer network elements in the network based on the collected IP layer traffic information, the passed context information, and the created association between the user location information and the RNC, wherein the first wireless layer network information and the passed context information each include a Service Area Identity or Cell Global Identification field, and the mapping uses the Service Area Identity or Cell Global Identification field as a common field to map the IP layer traffic and the wireless layer network elements in the network.

11. The method of claim 10, further comprising:

identifying at least one Service Area Identity or Cell Global Identification served by each RNC based on provisioning data included in the collected first wireless layer network element information.

12. The method of claim 11, the creating step including, creating a table from the provisioning data that maps each identified Service Area Identity or Cell Global Identification to its corresponding RNC.

13. The method of claim 10, wherein the passed context information is Packet Data Protocol (PDP) Context information.

14. The method of claim 13, wherein the PDP Context information includes a Service Area Identity or a Cell Global Identification, and at least one of an International Mobile Subscriber Identity, an International Mobile Equipment Identity, an End User Address, a Tunnel Endpoint Identifier, and a Serving GPRS Support Node (SGSN) Address.

15. The method of claim 1, wherein the mapping step maps at least one mobile station to a corresponding RNC.

16. The method of claim 15, wherein the mapping step further maps the at least one mobile station and the corresponding RNC to at least one of a corresponding International Mobile Subscriber Identity, End User Address, Tunnel Endpoint Identifier, and Serving GPRS Support Node (SGSN) Address.

17. The method of claim 10, further comprising:

continually updating the mapping of the IP layer traffic and the wireless layer network elements.

18. The method of claim 17, wherein the continually updating step is based on at least one of Update Packet Data Protocol (PDP) Context or Delete PDP Context information collected from the at least one interface.

* * * * *